(12) United States Patent
Barel

(10) Patent No.: US 9,720,523 B2
(45) Date of Patent: Aug. 1, 2017

(54) ACTIVE PENCIL AND TRANSMITTER

(71) Applicant: Microsoft Technology Licensing, LLC, Redmond, WA (US)

(72) Inventor: Eliyahu Barel, Beit-Aryeh (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 54 days.

(21) Appl. No.: 14/849,943

(22) Filed: Sep. 10, 2015

(65) Prior Publication Data

US 2017/0075439 A1   Mar. 16, 2017

(51) Int. Cl.
*G06F 3/0354* (2013.01)
*G06F 3/046* (2006.01)
*G06F 3/041* (2006.01)
*B43K 29/00* (2006.01)
*B43K 19/04* (2006.01)
*B43K 19/02* (2006.01)
*G06F 3/039* (2013.01)

(52) U.S. Cl.
CPC .......... *G06F 3/03545* (2013.01); *B43K 19/02* (2013.01); *B43K 19/04* (2013.01); *B43K 29/00* (2013.01); *G06F 3/039* (2013.01); *G06F 3/041* (2013.01); *G06F 3/046* (2013.01)

(58) Field of Classification Search
CPC ................................................ G06F 3/03545
See application file for complete search history.

(56) References Cited

U.S. PATENT DOCUMENTS

| 4,393,268 A * | 7/1983 | Guedj | G01B 17/00 178/18.04 |
|---|---|---|---|
| 2003/0193483 A1* | 10/2003 | Neville | G06F 3/041 345/173 |
| 2011/0290376 A1* | 12/2011 | Farooq | B43L 23/00 144/28.4 |
| 2014/0002422 A1 | 1/2014 | Stern et al. | |
| 2015/0169106 A1 | 6/2015 | Dix | |

FOREIGN PATENT DOCUMENTS

| FR | 3005287 | 11/2014 |
| JP | 09-006515 | 1/1997 |
| JP | 2015-084182 | 4/2015 |
| WO | WO 2015/071710 | 5/2015 |

OTHER PUBLICATIONS

International Search Report and the Written Opinion Dated Oct. 4, 2016 From the International Searching Authority Re. Application No. PCT/US2016/045662.

* cited by examiner

*Primary Examiner* — Gerald Johnson
(74) *Attorney, Agent, or Firm* — Miia Kati Janette Sula; Sergey Lamansky; Micky Minhas

(57) ABSTRACT

A device includes a connector configured to electrically contact a conductive core of a pencil and a circuit electrically connected to the contact. The circuit transmits a signal via the contact and the conductive core.

24 Claims, 10 Drawing Sheets

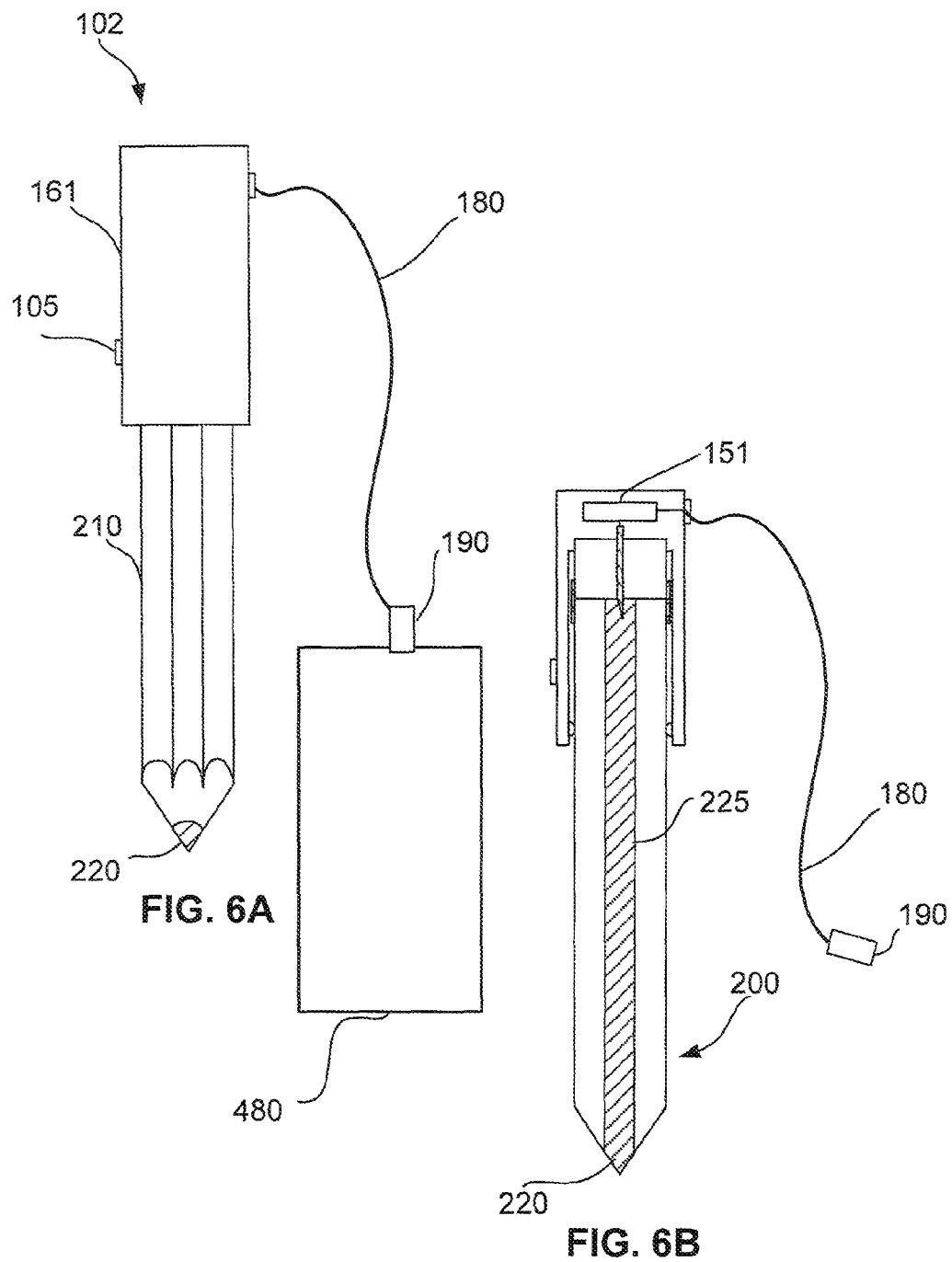

ACTIVE PENCIL AND TRANSMITTER

BACKGROUND

Digitizer sensors are used as computer input devices for capturing data or handwritten signatures, text, drawings, symbols and the like. Digitizing tablets and touch screens are exemplary digitizer sensors used to replace a mouse as a primary pointing and navigation device for desktop computers. A user interacts with the digitizer sensor by positioning and moving an object such as stylus and/or a finger over a sensing surface of the system, e.g. a tablet and/or a touch screen. Position of the object with respect to the sensor is sensed and interpreted as a user command. A stylus for interacting with the digitizer sensor can be a passive conductive object or a pointing device that transmits a signal.

SUMMARY

According to some embodiments of the present disclosure, there is provided a device that converts a pencil into a signal transmitting stylus. The device is an add-on device that can be removable attached to the pencil. Typically, a pencil is retrofitted with the device. When attached, the device electrically connects to the conductive core of the pencil, e.g. lead or graphite and operates the lead as an antenna for wirelessly transmitting signals. The device together with a standard pencil becomes and active pencil that communicates with a digitizer sensor by signal transmission. Signals transmitted by the pencil can be picked up at locations on a digitizer sensor, e.g. touch-screen. Position detection of the writing tip can be tracked while the pencil is either touching or hovering over the digitizer sensor. The add-on device with pencil provides a low cost alternative to purchasing a stylus that is dedicated for operating a digitizer sensor or for purchasing a high resolution digitizer sensor that can detect a passive stylus. It is often more convenient to provide input to a digitizer sensor with a sharp writing tip as opposed to with a finger. The active pencil may provide that convenience at relatively low cost.

According to some embodiments of the present disclosure, there is provided a digitizer system including a circuit that is adapted to track input received from an active pencil.

Unless otherwise defined, all technical and/or scientific terms used herein have the same meaning as commonly understood by one of ordinary skill in the art. Although methods and materials similar or equivalent to those described herein can be used in the practice or testing of embodiments of the disclosure, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

A mutual capacitive sensor is one type of digitizer sensor. Mutual capacitive sensors typically include a matrix formed with parallel conductive material arranged in rows and columns with a capacitive connection created around overlap and/or junction formed between the rows and columns. Bringing a finger or passive conductive object close to the surface of the sensor changes the local electrostatic field and changes the mutual capacitance between junction areas in the vicinity of the finger or conductive object. The capacitance change at junction points on the grid can be detected to determine location of the finger or conductive object on the capacitive sensor. The capacitance change is determined by applying a signal along one axis of the matrix and measuring the signal in the other axis. The pitch of the grid is typically defined based on an expected size of the object coupling with the sensor. For a relatively large diameter object such as a finger, a higher pitch can be used while for relative small diameter objects such as a conductive writing tip of a passive stylus a much smaller pitch would be required. Many known digitizer sensors are specifically geared toward detecting finger interaction and are therefore less suitable for detecting a relatively small diameter writing tip of a passive conductive stylus.

An electromagnetic stylus is another type of stylus known in the art for operating a digitizer system. The electromagnetic stylus operates by emitting an electromagnetic signal that can be picked by the mutual capacitive sensor. Position detection of a writing tip of the stylus can typically be performed while the object is either touching or hovering over the sensing surface. The emitted signal can be picked up by a mutual capacitive sensor even with a sensor that has a relatively high pitch.

Figure 1:
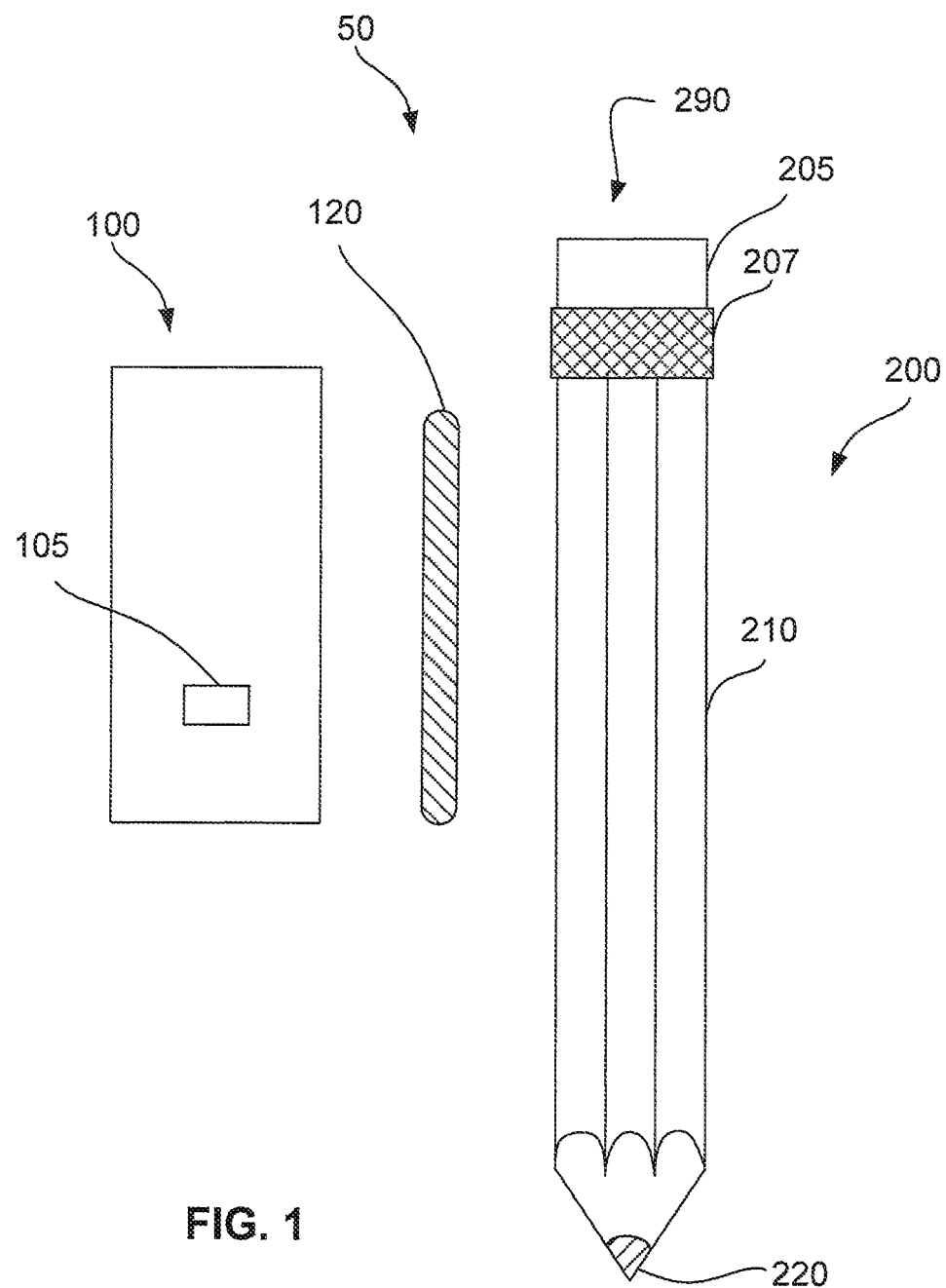

Some embodiments of the disclosure are herein described, by way of example only, with reference to the accompanying drawings. With specific reference now to the drawings in detail, it is stressed that the particulars shown are by way of example and for purposes of illustrative discussion of embodiments of the disclosure. In this regard, the description taken with the drawings makes apparent to those skilled in the art how embodiments of the disclosure may be practiced.

Figures 2A, 2B:
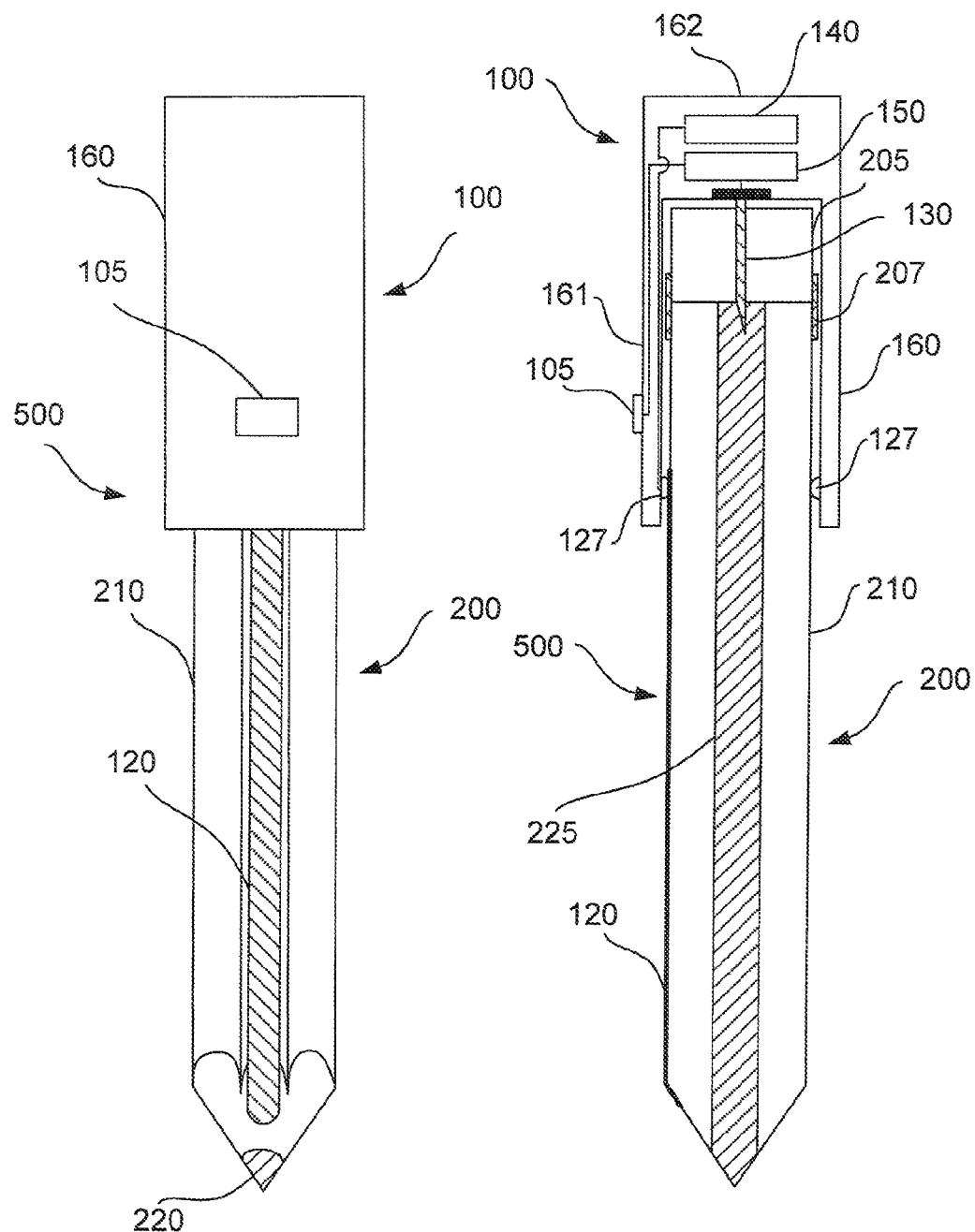
Figures 3A, 3B:
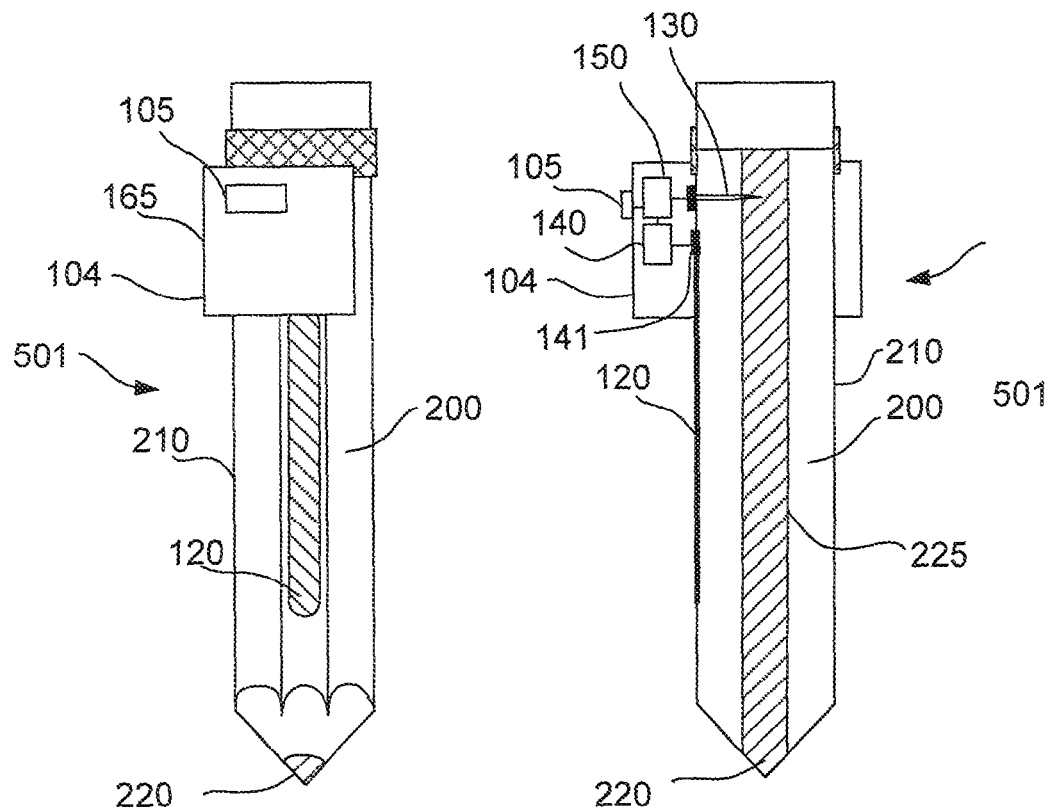
Figure 3C:
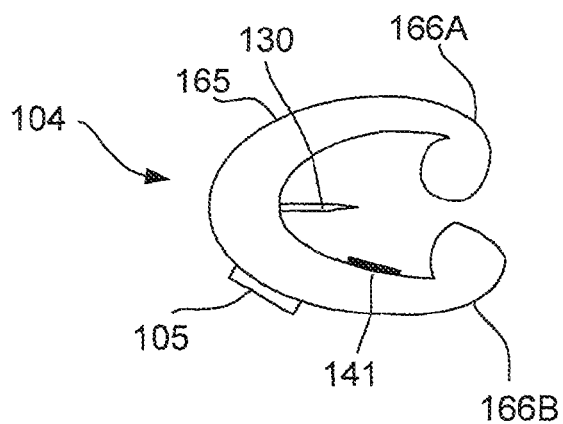
Figure 4A:
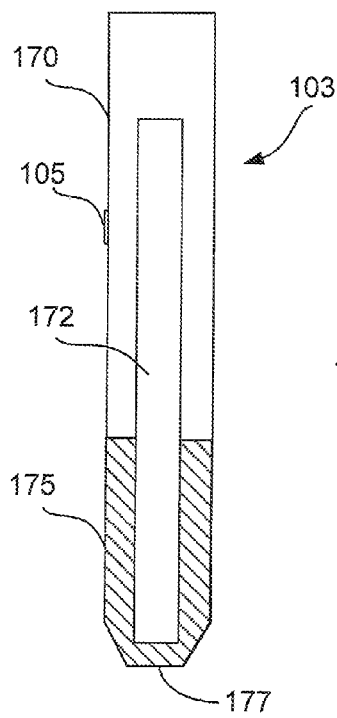
Figure 4B:
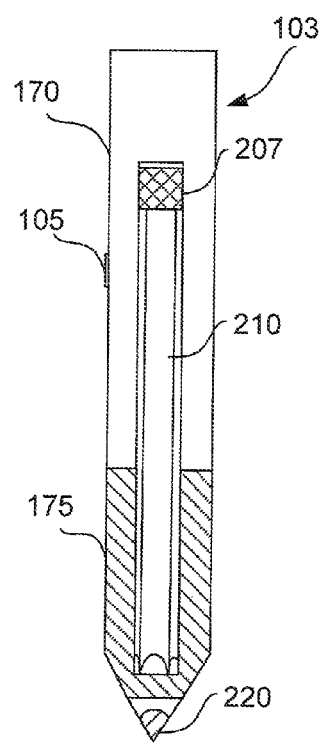
Figure 4C:
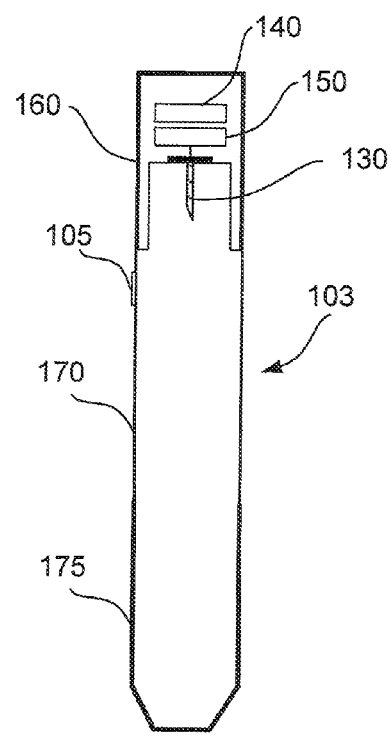
Figure 5A:
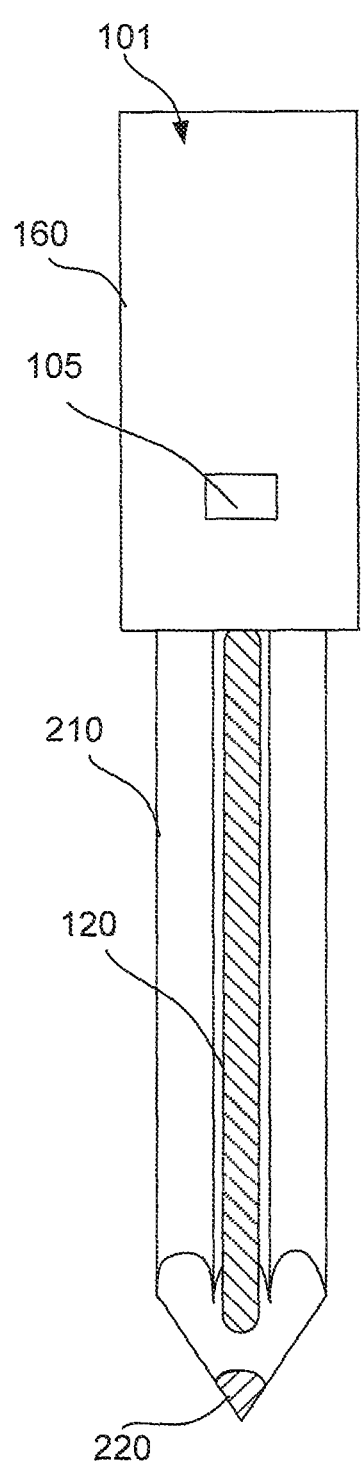
Figure 5B:
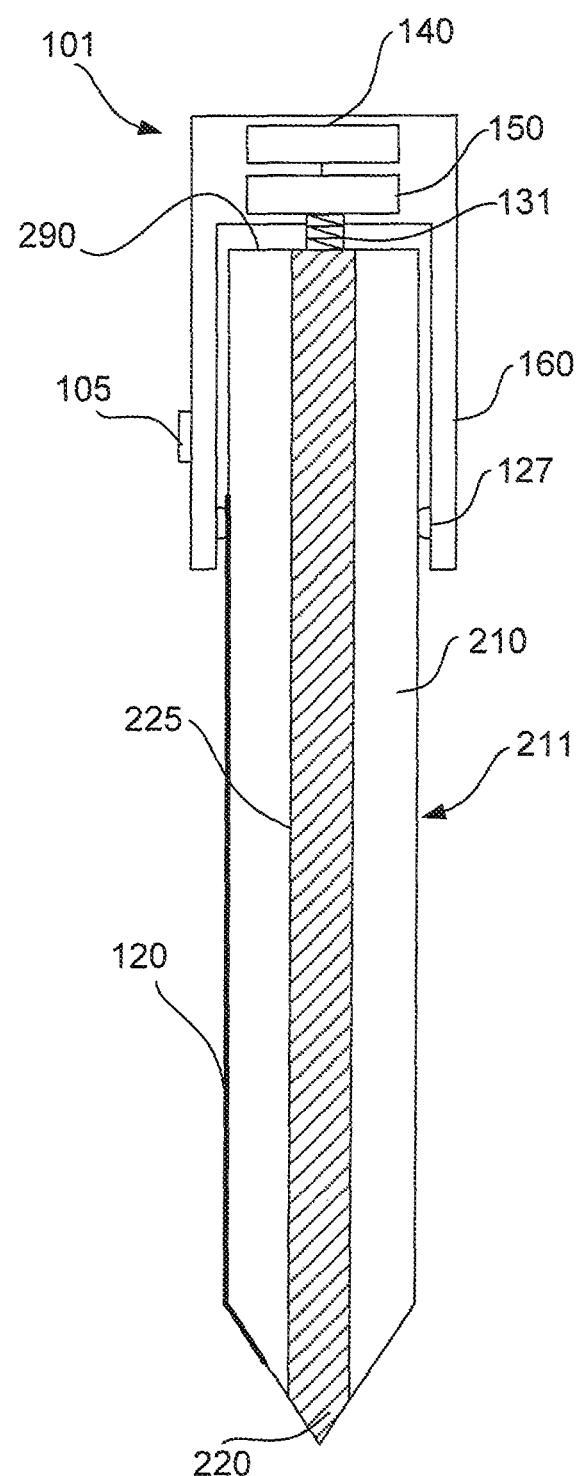
Figure 7:
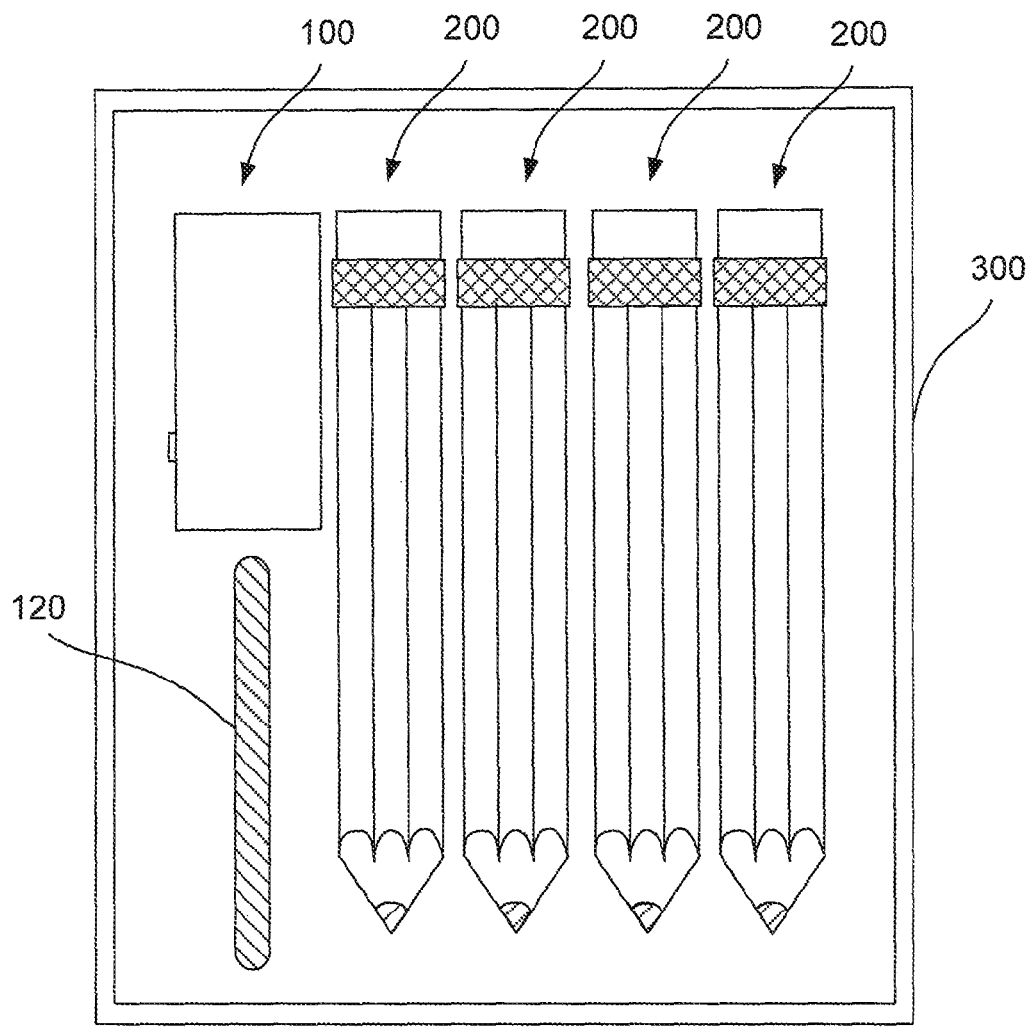
Figure 8:
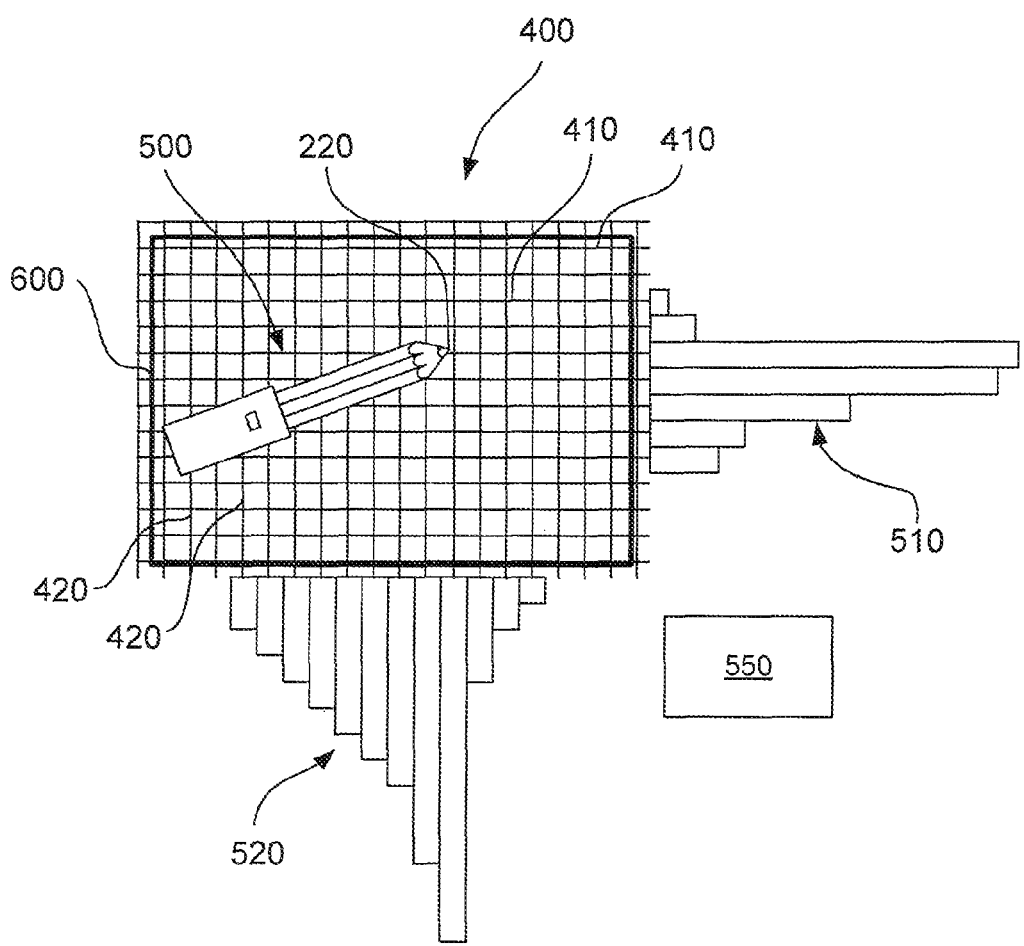
Figure 9:
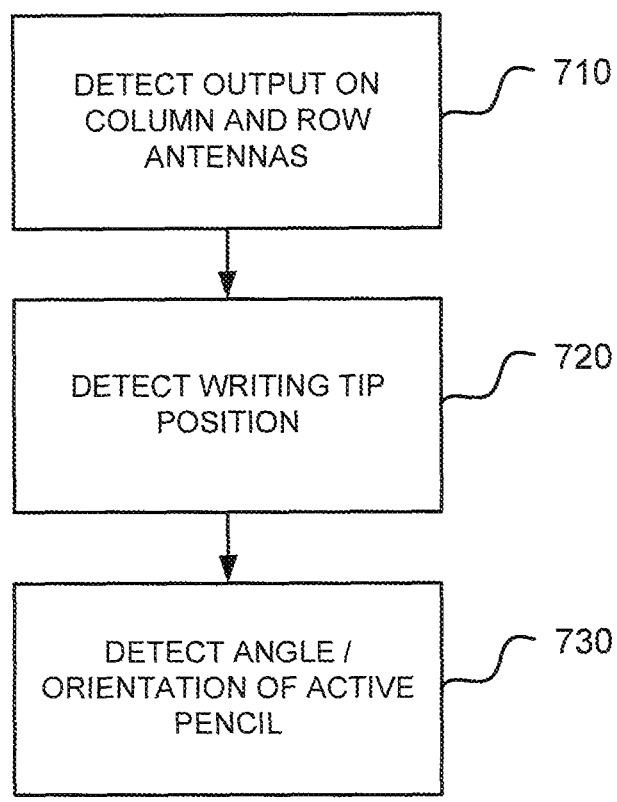
Figure 10:
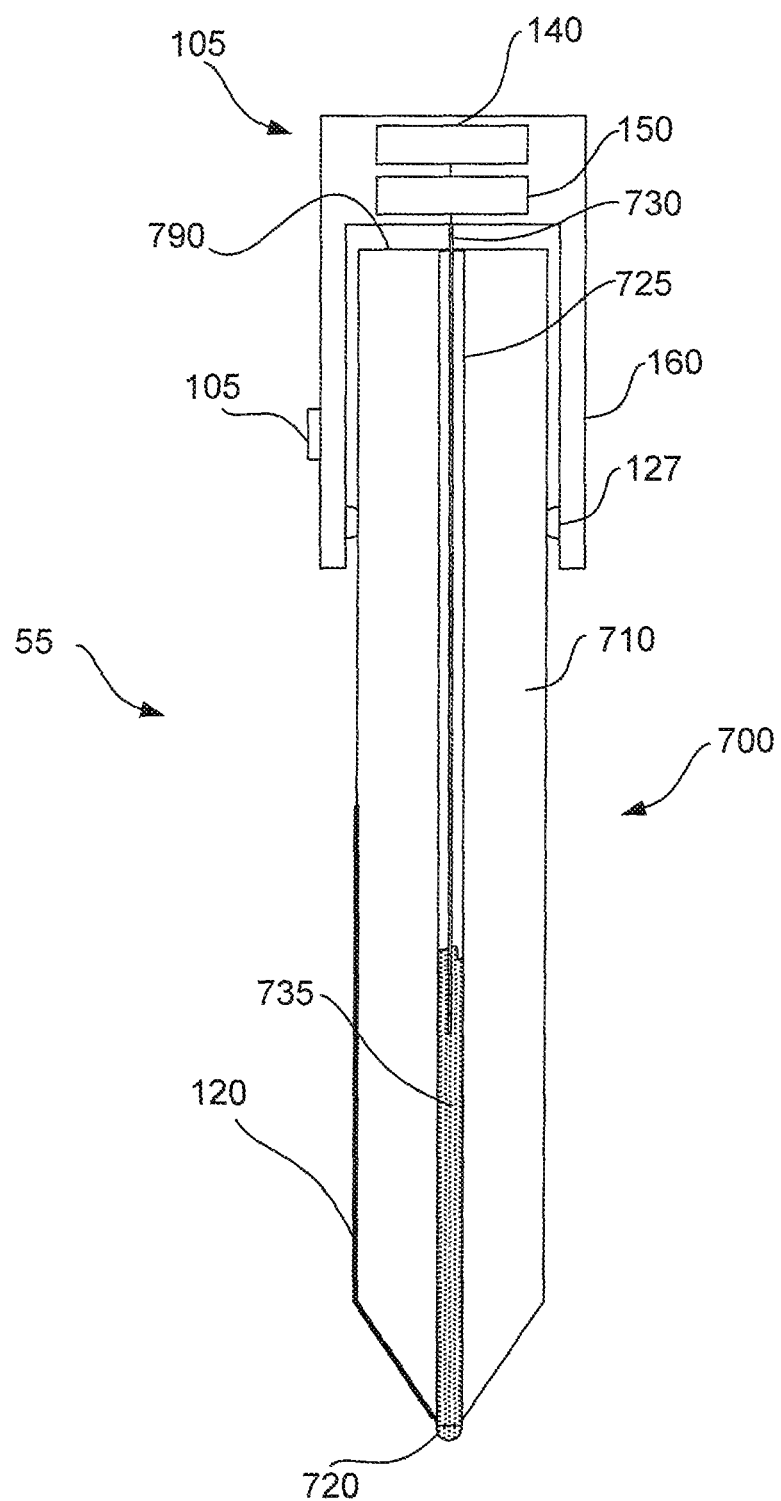

In the drawings:

FIG. 1 is a simplified schematic drawing including elements of an active pencil in accordance with some embodiments of the present disclosure;

FIGS. 2A and 2B are simplified schematic front and cross sectional views respectively of an activation unit fitted on a pencil, in accordance with some embodiments of the present disclosure;

FIGS. 3A, 3B and 3C are simplified schematic front, cross sectional and top views respectively of activation unit clasped to a pencil, in accordance with some embodiments of the present disclosure;

FIGS. 4A and 4B are simplified schematic front views of an activation unit with elastic sleeve and the activation unit fitted on a pencil in accordance with some embodiments of the present disclosure;

FIG. 4C is a simplified schematic cross sectional view of device with elastic sleeve, in accordance with some embodiments of the present disclosure;

FIGS. 5A and 5B are simplified schematic front and cross sectional views respectively of an activation unit fitted on a pencil without an eraser, in accordance with some embodiments of the present disclosure;

FIGS. 6A and 6B are simplified schematic front and cross sectional views respectively of a tethered device fitted on a pencil, in accordance with some embodiments of the present disclosure;

FIG. 7 is a simplified schematic drawing of a kit including an activation unit, a conductive strip and a plurality of pencils in accordance with some embodiments of the present disclosure;

FIG. 8 is a simplified schematic drawing graphically depicting output sensed by a digitizer sensor interacting with an active pencil in accordance with some embodiments of the present disclosure;

FIG. 9 is a simplified flow chart of an exemplary method for detecting input emitted from an active pencil, in accordance with some embodiments of the present disclosure; and FIG. 10 is a simplified schematic cross sectional view of an activation unit fitted on a pen, in accordance with some embodiments of the present disclosure.

DETAILED DESCRIPTION

According to some embodiments of the present disclosure, a device for converting a pencil to an active stylus includes a signal generator, a transmitter and a connector that electrically connects the transmitter of the device to the pencil lead. The device is an activation unit that activates a pencil so that its lead transmits signals that can be picked up by a digitizer sensor. The device may additionally include a power source, e.g. a battery or the device may alternatively be a tethered device, e.g. powered with USB connection. Optionally, the device is adapted to be mounted on an end of the pencil opposite the writing tip. Optionally, the device is adapted to be mounted on the eraser of the pencil. Optionally, the device is housed in a cap that fits over the end of the pencil opposite the writing tip. Typically, the device additionally includes a gripper for securing the device to the pencil, the cap includes a user operated button. The device is typically an add-on that can be easily and repeatedly attached and removed from the pencil.

The device may include a jacket or a sleeve that fits over a length of the pencil. Optionally, the jacket includes one or more user operated buttons are mounted on the jacket for selecting functions such as right-click or eraser. Optionally, the user operated button turns transmission ON/OFF. Optionally, the pencil is retrofitted with conductive material that extends along the surface to the lead to provide a low impedance to ground while a user grips the pencil. Typically, grounding the pencil during transmission significantly increases a field strength of the transmitted signal.

According to some embodiments of the present disclosure, a circuit associated with a digitizer sensor is adapted to track position of the transmitting pencil. Tracking position of a transmitting pencil is typically different than tracking position of known signal emitting styluses. When transmitting via the pencil lead, the signal is typically transmitted over an entire length of the lead as opposed to being concentrated near the writing tip. Typically, the circuit is adapted to detect position of the writing tip on the transmission over the entire length of the pencil lead. Optionally, the circuit additionally, tracks additional features such as angle or direction of the pencil.

Before explaining at least one embodiment of the exemplary embodiments in detail, it is to be understood that the disclosure is not necessarily limited in its application to the details of construction and the arrangement of the components and/or methods set forth in the following description and/or illustrated in the drawings. The disclosure is capable of other embodiments or of being practiced or carried out in various ways.

Reference is now made to FIG. 1 showing a simplified schematic drawing including elements of an active pencil in accordance with some embodiments of the present disclosure. According to some embodiments of the present disclosure a signal transmitting pencil, e.g. an active pencil is assembled with a pencil 200 and an activation unit 100 adapted to fit on pencil 200. Typically, activation unit 100 is adapted to fit over an end 290 of pencil 200 that is distal to a writing tip 220 of pencil 200. Optionally, the active pencil includes conductive material, e.g. conductive tape that is positioned on pencil 200 in electrically communication with activation unit 100 to provide ground when a user grasps pencil 200. Optionally, activation unit 100 includes one or more user operated buttons 105 that can alter operation of activation unit 100 when selected by a user. Button 105 may also be an ON/OFF power switch for turning signal transmission ON/OFF. Pencil 200 can be any standard pencil that includes a graphite writing tip or other electrically conductive writing tip surrounded by a housing 210 such as a wooden housing that is non-conducting. Optionally, pencil 200 includes an eraser 205 mounted with a ferrule 207 and activation unit is mounted over eraser 205. Activation unit 100 includes a connector for electrically connecting to a lead of pencil 200 at distal end.

Reference is now made to FIGS. 2A and 2B showing a simplified schematic front and cross sectional view respectively of an activation unit fitted on a pencil, in accordance with some embodiments of the present disclosure. According to some embodiments of the present disclosure, active pencil 500 includes activation unit 100 mounted on pencil 200. Optionally, active pencil 500 additionally includes conductive material 120 that is applied on non-conductive housing 210 of pencil 200. Conductive material 120 is applied to extend from activation unit 100 (ground terminal) toward writing tip 220. Conductive material 120 is used to ground active pencil 500 while a user holds pencil 200 and touches conductive material 120. Other methods may be used to ground active pencil including wrapping a conductive spring element around a diameter of pencil 200 with an end of the spring making contact with ground terminal of activation unit 100, e.g. a negative terminal. Activation unit 100 includes one or more application specific integration circuits (ASIC) 150 for operating active pencil 500 that is housed in a housing 160. ASIC 150 includes a signal generator and a transmitter or signal generation and transmission capability. Optionally, activation unit 100 is powered with an internal power source 140, e.g. a battery.

Activation unit 100 additionally includes a connector 130 that electrically connects ASIC 150 to a lead 225 of pencil 200. Lead 225 extends over a length of pencil 200 and forms writing tip 220. Optionally, connector 130 is a metallic blade, nail, tack or needle that can penetrate through eraser 205 and into lead 225 to establish electrical contact. Optionally, connector 130 is associated with a sensing element for sensing when pressure is applied on connector 130 and transmission is initiated only when pressure is applied on connector 130. Typically, pressure will only be applied on connector 130 when mounted on pencil 200. Optionally, the sensing element is integrated on ASIC 150. Optionally, when activation unit is removed from pencil 200, the pressure is released and transmission stops.

Housing 160 may be shaped as a cap and sized to fit over a standard pencil. Housing 160 can be secured onto pencil 200 with a gripper 127. Gripper 127 may be an o-ring element or may be formed by a plurality of humps of elastic material on an inner surface of housing 160. Typically, gripper 127 provides for removeably attaching activation unit 100 to pencil 200. Optionally, gripper 127 is connected to a ground terminal of activation unit, e.g. a negative terminal of power source 140 and provides an electrical connection between activation unit 100 and conductive material 120. Conductive material 120 may also be used to shield a signal transmitted via lead 225 so that transmission is concentrated near writing tip 220.

Button 105 can be position anywhere on housing 160 that can be accessed by a user, e.g. on a side wall 161 as shown or on a top 162 of housing 160. Optionally, button 105 provides right-click and eraser functionality. Optionally, frequency or modulation of a signal transmitted by active pencil 500 is altered when a user selects button 105. Optionally, activation unit 100 can include a plurality of user activated buttons.

Reference is now made to FIGS. 3A, 3B and 3C showing a simplified schematic front, cross sectional and top views respectively of an activation unit clasped to a pencil, in accordance with some embodiments of the present disclosure. In some exemplary embodiments, connector 130 of activation unit 104 is designed to electrically connect to lead 225 through a wall of pencil 200 by penetrating through housing 210, e.g. wood housing of pencil 200. Optionally, housing 165 includes arms 166A and 166B that hold pencil 200 or wrap around pencil 200 to fixate housing 165 to pencil 200. Optionally, activation unit 104 includes a conductive pad 141 connected to a negative pole of power source 140 or ground terminal of ASIC 150. Conductive material 120 is mounted on pencil 200 so that it contacts conductive pad 141 and also extends a long a length of pencil 200 toward writing tip 220. While a user holds pencil 200, contact between the user and conductive material 120 provides low impedance to ground.

Reference is now made to FIGS. 4A and 4B showing a simplified schematic front view of an activation unit with elastic sleeve and the activation unit fitted on a pencil and to FIG. 4C showing a simplified schematic cross sectional view of device with elastic sleeve, all in accordance with some embodiments of the present disclosure. In some exemplary embodiments, activation unit 103 includes a sleeve housing 170 that is sized to fit over pencil 200. Sleeve housing 170 may include an opening 177 through which writing tip 220 can protrude. Optionally sleeve housing 170 includes one or more windows 172 that facilitate easy insertion of pencil 200 into sleeve housing 170. Sleeve housing 170 can be formed from elastic material that can be stretched when housing pencil 200 or from flexible material. Optionally, cap 160 or other rigid structure is housed in sleeve housing 170 for holding ASIC 150, connector 130 and optionally power source 140. Button 105 may be integrated on elastic wall of sleeve housing 170 or may be fixed on rigid structure 160. Sleeve housing 170 may include conductive material 175, e.g. conductive paint or coating that is electrically connected to one terminal, e.g. ground terminal or negative terminal of activation unit 103 while connector 130 is connected to another terminal, e.g. a positive terminal of activation unit 103. Optionally, conductive material substantially covers housing 210 and shields signals transmitted with lead 225, e.g. graphite.

Reference is now made to FIGS. 5A and 5B showing a simplified schematic front and cross sectional view respectively of an activation unit fitted on a pencil without an eraser, in accordance with some embodiments of the present disclosure. Activation unit 101 may be adapted to be assembled on a pencil 211 that does not include an eraser. Lead 225 of pencil 211 is typically exposed in its distal end 290. Connector 131 may be in a form of a spring or other conductive elastic element that makes physical contact with lead 225 at distal end 290 or by a screw or needle that penetrates into lead 225. Alternatively, connector 131 is a similar to connector 130 in construction but shorter.

Reference is now made to FIGS. 6A and 6B showing a simplified schematic front and cross sectional view respectively of a tethered device fitted on a pencil, in accordance with some embodiments of the present disclosure. In some exemplary embodiments, an activation unit 102 is a tethered device that is powered externally. Optionally, activation unit 102 connects to an external device with a USB connector 190. A wire 180 connects ASIC 151 of activation unit 102 to an external computing device 480 that powers activation unit 102. Optionally, the tethered connection is used for data communication between computing device 480 and activation unit 102.

Reference is now made to FIG. 7 showing a simplified schematic drawing of a kit including an activation unit, and a plurality of pencils in accordance with some embodiments of the present disclosure. In some exemplary embodiments, activation unit 100 is packaged in a kit 300 with one or more pencils. Optionally, kit 300 additionally includes conductive tape 120 for grounding pencil 200 when being used as an active pencil. Alternatively, activation unit 100 and conductive tape 120 are packaged separately from pencils 200 and a user is instructed to connect activation unit 100 to a standard pencil. Optionally, activation unit 100 is replaced by activation unit 101, 102, 103 or 104.

Reference is now made to FIG. 8 showing a simplified schematic drawing graphically depicting output sensed by a digitizer sensor interacting with an active pencil and to FIG. 9 showing a simplified flow chart of an exemplary method for detecting input emitted from an active pencil, both in accordance with some embodiments of the present disclosure. Active pencil 500 is suitable for interacting with a capacitive based digitizer sensor 400 including row antennas 410 and column antennas 420 arranged in a grid. Digitizer sensor 400 may be integrated on an electronic display 600. Typically, a controller 550 controls operation of sensor 400 and samples outputs from row antennas 410 and column antennas 420 (block 710). Amplitudes 510 of outputs detected from row antennas 410 and amplitudes 520 of outputs detected from column antennas 420 are examined to detect location of writing tip 220 (block 720). Optionally, peak detection is implemented to identify location of writing tip 220. Optionally, a pattern of amplitudes 510 and 520 across the row and column direction is also examined to detect angle and/or orientation of active pencil 500 with respect to digitizer sensor 400 (block 730). The spread of output across digitizer sensor 400 will typically be asymmetric when the active pencil is held at an angle with respect to the sensing surface. Typically, gradient of peak formed with the amplitudes detected on the antenna lines will be lower on the side at which the active pencil is leaning toward. Active pencil 500 typically transmits all along a length of active pencil 500 and therefore outputs detected on digitizer sensor 400 will typically extended along an area overlapping a length of active pencil 500. Examination of the signal spread on digitizer sensor 400 can be used to identify a tilt direction and orientation of active pencil 500. Optionally, part of a hand or palm holding active pencil 500 can also be identified and used as additionally information regarding user input. Optionally, tilt with respect to a surface of digitizer sensor 400 can be detected based on extent of the signal spread. When the active pencil is held at right angles with the sensing surface, the spread of the signal will be significantly smaller and significantly more symmetric than with active pencil 500 is resting on the sensing surface. Optionally, information regarding angle of active pencil 500 with respect to the sensing surface of sensor 400 is used modulate a width of a line drawn on electronic display 600 while a user is drawing with active pencil 500. The pattern of out may provide more data on user writing direction and tilt angle. Optionally, this information can be translated by the digitizer system or related computing device as artist and painter features.

Reference is now made to FIG. 10 showing a simplified schematic cross sectional view of an activation unit fitted on a pen, in accordance with some embodiments of the present disclosure. Optionally, an activation unit 105 is adapted to activate a standard off the shelf pen 700 such as a ball point pen or felt pen. Activation unit 105 includes many of the same components as exemplary activation units 100, 101, 102 and 103 but includes a connector 730 that is adapted to establish an electrical connection between ASIC 150 and conductive ink 735 in a cartridge 725 of pen 700. Typically, activation unit 105 is mounted on a distal end 790 with respect to writing tip 720 of pen 700. Optionally, conductive material 120 extending toward tip 720 can be positioned on housing 710 of pen 700 to ground pen 700 during transmission. Optionally, a cap that typically covers distal end 790 of pen 700 is removed prior to mounting activation unit 105.

According to an aspect of some embodiments of the present disclosure there is provided a device comprising: a connector configured to electrically contact a conductive core of a pencil; a circuit electrically connected to the contact, the circuit configured to transmit a signal via the contact and the conductive core.

Optionally, the device includes a housing configured to be mounted on the pencil.

Optionally, the housing includes a gripper configured to grip the pencil.

Optionally, the housing is configured to be removeably mounted on the pencil.

Optionally, the housing includes a user operated button configured to turn transmission ON/OFF.

Optionally, the housing includes a user operated button configured to alter parameter of the signal for transmission.

Optionally, the housing is configured to be mounted on an end of the pencil distal to a writing tip of the pencil.

Optionally, the housing houses a power source to power operation of the circuit.

Optionally, the circuit is configured to generate a signal via the conductive core, the signal configured to be picked up by a digitizer sensor.

Optionally, the connector is configured to contact the conductive core distal to a writing tip of the pencil.

Optionally, the connector is configured to pierce the conductive core.

Optionally, the connector is configured to penetrate through an eraser on the pencil.

Optionally, the device comprises a conductive strip positioned on the pencil, wherein the conductive strip is in electrical communication with the circuit.

Optionally, the device includes a tethered connection configured to connect to a power source to power operation of the circuit.

Optionally, the device includes an elastic sleeve configured to be fitted onto the pencil, wherein the elastic sleeve includes an opening through which a writing tip of the pencil protrudes.

Optionally, the device includes a sensor for sensing pressure applied on the connector.

According to an aspect of some embodiments of the present disclosure there is provided an active pencil comprising: a pencil comprising a conductive core surrounded by an insulator; and an activation unit comprising: a transmitter configured to generate a signal for transmission; and a connector configured to establish electrical communication between the transmitter and the conductive core of the pencil.

Optionally, the activation unit is configured to be removably mounted on the pencil.

Optionally, the activation unit includes a user operated button configured to turn transmission ON/OFF or to alter a parameter of the signal for transmission.

Optionally, activation unit is mounted on an end of the pencil distal to a writing tip of the pencil.

Optionally, the connector is configured to engage the conductive core at an end of the pencil distal to a writing tip of the pencil.

Optionally, the pencil includes a conductive strip mounted on the pencil and configured to ground transmission while a user holds the pencil.

Optionally, the activation unit includes a power source.

Optionally, the activation unit is powered by tethered connection to a computing device.

According to an aspect of some embodiments of the present disclosure there is provided a kit comprising: a pencil; and an activation unit configured to be removably mounted on the pencil and to transmit signals via a lead of the pencil while mounted on the pencil.

Optionally, the kit includes a conductive strip configured to be mounted on the pencil.

Optionally, the activation unit includes a connector configured to electrically connect to a conductive core of the pencil and to transmit a signal via the conductive core.

Optionally, the activation unit is configured to be removeably mounted on the pencil.

Certain features of the examples described herein, which are, for clarity, described in the context of separate embodiments, may also be provided in combination in a single embodiment. Conversely, various features of the examples described herein, which are, for brevity, described in the context of a single embodiment, may also be provided separately or in any suitable sub-combination or as suitable in any other described embodiment of the disclosure. Certain features described in the context of various embodiments are not to be considered essential features of those embodiments, unless the embodiment is inoperative without those elements.

What is claimed is:

1. A device comprising:
   a housing configured to be removeably mounted on the pencil;
   a connector configured to electrically contact a conductive core of a pencil; and
   a circuit electrically connected to the contact, the circuit configured to transmit a signal via the contact and the conductive core, wherein the connector and the circuit are housed in the housing and wherein the connector is configured to establish the electrical contact based on the housing being mounted on the pencil.

2. The device of claim 1, wherein the housing includes a gripper configured to grip the pencil.

3. The device of claim 1, wherein the housing includes a user operated button configured to turn transmission ON/OFF.

4. The device of claim 1, wherein the housing includes a user operated button configured to alter parameter of the signal for transmission.

5. The device of claim 1, wherein the housing is configured to be mounted on an end of the pencil distal to a writing tip of the pencil.

6. The device of claim 1, wherein the housing houses a power source to power operation of the circuit.

7. The device of claim 1, wherein the circuit is configured to generate a signal via the conductive core, the signal configured to be picked up by a digitizer sensor.

8. The device of claim 1, wherein the connector is configured to contact the conductive core distal to a writing tip of the pencil.

9. The device of claim 1, wherein the connector is configured to pierce the conductive core.

10. The device of claim 1, wherein the connector is configured to penetrate through an eraser on the pencil.

11. The device of claim 1, comprising a conductive strip mounted on an outer surface of the pencil, wherein the conductive strip is in electrical communication with the circuit.

12. The device of claim 1, comprising a tethered connection configured to connect to a power source to power operation of the circuit.

13. The device of claim 1, comprising an elastic sleeve configured to be fitted onto the pencil, wherein the elastic sleeve includes an opening through which a writing tip of the pencil protrudes.

14. The device of claim 1, comprising a sensor for sensing pressure applied on the connector.

15. An active pencil comprising:
 a pencil comprising a conductive core surrounded by an insulator; and
 an activation unit comprising:
  a transmitter configured to generate a signal for transmission; and
  a connector configured to establish electrical communication between the transmitter and the conductive core of the pencil, wherein the activation unit is configured to be removably mounted on the pencil and wherein the connector is configured to initiate the electrical contact with the conductive core of the pencil based on the activation unit being mounted on the pencil.

16. The active pencil of claim 15, wherein the activation unit includes a user operated button configured to turn transmission ON/OFF or to alter a parameter of the signal for transmission.

17. The active pencil of claim 15, wherein activation unit is mounted on an end of the pencil distal to a writing tip of the pencil.

18. The active pencil of claim 15, wherein the connector is configured to engage the conductive core at an end of the pencil distal to a writing tip of the pencil.

19. The active pencil of claim 15, comprising a conductive tape mounted on the pencil and configured to ground transmission while a user holds the pencil.

20. The active pencil of claim 15, wherein the activation unit includes a power source.

21. The active pencil of claim 15, wherein the activation unit is powered by tethered connection to a computing device.

22. A kit comprising:
 a pencil; and
 an activation unit configured to be removably mounted on the pencil and to transmit signals via a lead of the pencil while mounted on the pencil, wherein the activation unit is configured to initiate electric contact with the lead of the pencil based being mounting on the pencil.

23. The kit according to claim 22, comprising a conductive tape is configured to be mounted on an outer surface of the pencil.

24. The kit according to claim 22, wherein the activation unit includes a connector configured to electrically connect to a conductive core of the pencil and to transmit a signal via the conductive core.

* * * * *